United States Patent
Zeng

(10) Patent No.: US 10,183,806 B1
(45) Date of Patent: Jan. 22, 2019

(54) TELEMETRIC DIGITAL THERMOMETER WITH GPS TRACKING

(71) Applicant: ANYTREK CORPORATION, Ontario (CA)

(72) Inventor: Haijian Zeng, Shenzhen (CN)

(73) Assignee: Anytrek Corporation, Ontario, CA (US)

(*) Notice: Subject to any disclaimer, the term of this patent is extended or adjusted under 35 U.S.C. 154(b) by 0 days.

(21) Appl. No.: 15/788,412

(22) Filed: Oct. 19, 2017

Related U.S. Application Data

(60) Provisional application No. 62/548,862, filed on Aug. 22, 2017.

(51) Int. Cl.
   *G01K 13/00* (2006.01)
   *G01K 1/14* (2006.01)
   (Continued)

(52) U.S. Cl.
   CPC ............ *B65D 90/48* (2013.01); *B65D 88/12* (2013.01); *B65D 88/74* (2013.01); *B65D 90/04* (2013.01); *G01K 1/024* (2013.01); *G01K 1/14* (2013.01); *H04Q 9/00* (2013.01); *G01S 19/14* (2013.01); *H04B 1/02* (2013.01); *H04Q 2209/40* (2013.01)

(58) Field of Classification Search
   CPC .......... G06K 19/07749; G06K 7/10861; H04L 67/12; H04L 67/04; H04L 67/1097; H04L 1/00; H04L 2209/805; H04L 9/0894; G01K 3/04; G01K 1/024; G01K 13/00; G01K 1/14; G01K 2217/00; G01K 7/026;
   (Continued)

(56) References Cited

U.S. PATENT DOCUMENTS 4,498,306 A * 2/1985 Tyree, Jr. .................. B60P 3/20
                                                       165/104.21
5,125,237 A * 6/1992 Saia, III ............... B60H 1/3226
                                                       62/239
(Continued)

FOREIGN PATENT DOCUMENTS

BR          9804449 A  *  6/2000
CN          2320994         5/1999
(Continued)

*Primary Examiner* — Gail Kaplan Verbitsky
(74) *Attorney, Agent, or Firm* — Klein, O'Neill & Singh, LLP

(57) ABSTRACT

A telemetric digital thermometer for use with a fluid transport container having internal and external shells. The telemetric digital thermometer includes a mount having a peripheral flange and a support collar, with the peripheral flange being connectable to the external shell. A temperature sensor sense a temperature of the internal shell. A thermometer insert may include an outer collar engageable with the peripheral flange, and an inner body engageable with the support collar. A GPS module may detect position of the thermometer insert. A wireless transceiver may transmit a signal including temperature data and position data. The thermometer insert and the mount may be collectively sized and structured such that the GPS module and the wireless transceiver are positioned radially outward of the external shell when the thermometer insert is connected to the mount and the mount is connected to the external shell.

23 Claims, 7 Drawing Sheets

(51) Int. Cl.
*B65D 90/48* (2006.01)
*G01K 1/02* (2006.01)
*B65D 88/12* (2006.01)
*B65D 88/74* (2006.01)
*H04Q 9/00* (2006.01)
*B65D 90/04* (2006.01)
*H04B 1/02* (2006.01)
*G01S 19/14* (2010.01)

(58) Field of Classification Search
CPC .... G01K 1/022; G01K 2207/04; G01N 33/02; G01N 25/482; G01N 33/12
USPC .............. 374/121, 208, 163, 185, 141, 120; 340/870.17
See application file for complete search history.

(56) References Cited

U.S. PATENT DOCUMENTS

| | | | |
|---|---|---|---|
| 6,260,360 B1* | 7/2001 | Wheeler | A01N 1/02 62/3.6 |
| 6,799,434 B1* | 10/2004 | Hobbs, Jr. | F25D 29/00 62/371 |
| 6,854,883 B2* | 2/2005 | Rund | G01K 15/00 116/216 |
| 7,004,623 B2* | 2/2006 | Nakagawa | G01K 1/022 136/200 |
| 8,154,421 B2* | 4/2012 | Saltzman | H04Q 9/00 340/870.17 |
| 8,162,542 B2* | 4/2012 | Harman | B65D 88/14 220/1.5 |
| 2002/0088244 A1* | 7/2002 | Jennings | A47F 3/0404 62/371 |
| 2002/0186145 A1* | 12/2002 | Chainer | G06K 19/0717 340/870.16 |
| 2003/0101742 A1* | 6/2003 | Norelius | B65D 88/14 62/387 |
| 2004/0025606 A1* | 2/2004 | Veenstra | A01J 5/007 73/865.9 |
| 2005/0188715 A1* | 9/2005 | Aragon | F25D 3/125 62/371 |
| 2006/0026971 A1* | 2/2006 | Sharpe | G01J 5/0037 62/126 |
| 2006/0225443 A1* | 10/2006 | Tamborra | G01K 3/04 62/157 |
| 2007/0015975 A1* | 1/2007 | Faries, Jr. | A61J 1/1462 600/300 |
| 2008/0135563 A1* | 6/2008 | Hickey | G01K 13/00 220/592.01 |
| 2009/0143923 A1* | 6/2009 | Breed | G08G 1/205 701/1 |
| 2009/0145912 A1* | 6/2009 | Hyde | B65D 81/3802 220/592.26 |
| 2009/0212047 A1* | 8/2009 | Harman | B65D 88/14 220/1.5 |
| 2011/0005240 A1* | 1/2011 | Chapa | F25D 3/08 62/62 |
| 2011/0068954 A1* | 3/2011 | McQuade | G08G 1/20 340/988 |
| 2011/0227722 A1* | 9/2011 | Salvat, Jr. | G01S 5/0027 340/539.1 |
| 2012/0000212 A1* | 1/2012 | Sanders | F25D 29/003 62/62 |
| 2013/0193005 A1* | 8/2013 | Hoeth | G10G 7/005 206/14 |
| 2014/0144161 A1* | 5/2014 | Pointer | B65D 81/3823 62/62 |
| 2015/0122688 A1* | 5/2015 | Dias | A47G 19/025 206/459.1 |
| 2015/0192670 A1* | 7/2015 | Jo | G01S 13/951 702/190 |
| 2015/0204598 A1* | 7/2015 | Affleck | B65B 3/003 700/228 |
| 2016/0011162 A1* | 1/2016 | Minvielle | A23L 3/001 702/30 |
| 2016/0095310 A1* | 4/2016 | Anderson | A01N 1/0247 435/284.1 |
| 2016/0297606 A1* | 10/2016 | Roger | B65D 88/744 |
| 2018/0004230 A1* | 1/2018 | Leonard | G05D 1/0891 |
| 2018/0009588 A1* | 1/2018 | Grogan | B65D 81/18 |

FOREIGN PATENT DOCUMENTS

| | | | |
|---|---|---|---|
| CN | 103499400 B | * | 1/2016 |
| KR | 20100058947 A | * | 6/2010 |
| RU | 2053465 C1 | * | 1/1996 |

* cited by examiner

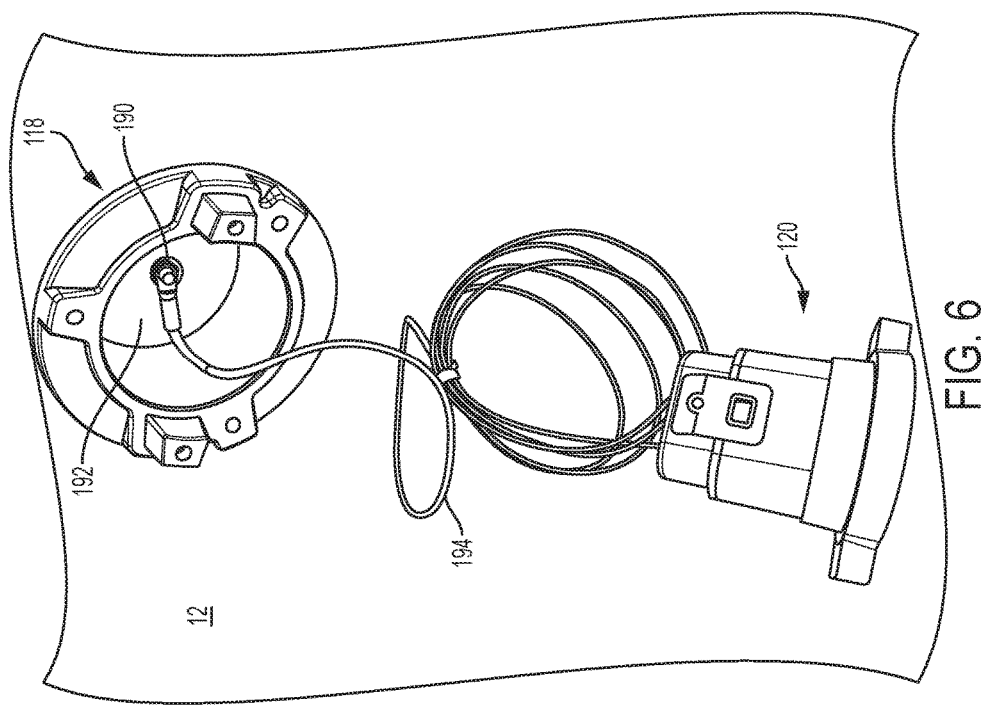

TELEMETRIC DIGITAL THERMOMETER WITH GPS TRACKING

CROSS-REFERENCE TO RELATED APPLICATIONS

This application relates to and claims the benefit of U.S. Provisional Application No. 62/548,862 filed on Aug. 22, 2017, the contents of which is expressly incorporated by reference herein.

STATEMENT RE: FEDERALLY SPONSORED RESEARCH/DEVELOPMENT

Not Applicable

BACKGROUND

1. Technical Field

The present disclosure relates generally to a telemetric system with a thermometer, more particularly, a digital thermometer and with GPS tracking capabilities for use with a food grade cold fluid tank trailer.

2. Description of the Related Art

The transport of food grade fluids, such as milk, juice, vegetable oil, and wine, oftentimes requires temperature control of the fluids during transport to preserve the fluid. To that end, specialized transport containers have been developed, which may allow for transport of such temperature sensitive materials within a temperature controlled environment.

Transport of food grade fluids within such specialized transport containers may raise concerns over monitoring the temperature of the fluid within the container to ensure the fluid remains within an acceptable temperature range during the duration of the trip. Unfortunately, there are certain deficiencies in the art.

Accordingly, there is a need in the art for an improved thermometer. Various aspects of the present disclosure discuss an improved thermometer.

BRIEF SUMMARY

Various aspects of the present disclosure are related to a telemetric digital thermometer for use with a food grade fluid transport container, and a related method of using the telemetric digital thermometer. The telemetric digital thermometer may be capable of tracking both temperature and location of the fluid transport container. The telemetric digital thermometer may also be capable of automatically uploading sensed temperature readings and position data automatically on a preset time schedule (e.g., once an hour).

In accordance with one embodiment of the present disclosure, there is provided a telemetric digital thermometer for use with a food grade fluid transport container having an internal shell defining a reservoir for receiving fluid, and an external shell spaced from the internal shell. The telemetric digital thermometer may include a mount having a peripheral flange and a support collar. The peripheral flange may extend radially outward from the support collar and may be connectable to the external shell. A temperature sensor may be connectable to the internal shell for sensing a temperature of the internal shell. A thermometer insert may be operatively connected to the temperature sensor and connectable to the mount. The thermometer insert may include an outer collar engageable with the peripheral flange, and an inner body engageable with the support collar. A GPS module may be included to detect position of the thermometer insert. A wireless transceiver may be in operative communication with the temperature sensor and the GPS module to transmit a signal temperature data from the temperature sensor and position data from the GPS module. The thermometer insert and the mount may be collectively sized and structured such that the GPS module and the wireless transceiver are positioned radially outward of the external shell when the thermometer insert is connected to the mount and the mount is connected to the external shell.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 6 is a side view depicting connecting the digital thermometer to a food grade fluid transport container;

Common reference numerals are used throughout the drawings and the detailed description to indicate the same elements.

DETAILED DESCRIPTION

The detailed description set forth below in connection with the appended drawings is intended as a description of certain embodiments of a digital thermometer for a food grade fluid transport container and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Food grade fluid transport containers may be used to transport fluids, such as juice, milk, wine, vegetable oil, and other consumable fluids in temperature controlled environments. A conventional food grade fluid transport container may be configured as a trailer for connection to a semi-truck for transport. The transport container may include a rigid inner shell defining a reservoir for storing the fluid during transport. The rigid inner shell may be disposed about a longitudinal axis, which extends along the length of the container. The rigid inner shell may include a cylindrical wall and a pair of opposed walls, which collectively define the reservoir. The cylindrical wall may be formed from heavy duty stainless steel, which may be passed through a roller to form the desired curvature in the rigid inner shell. One or more openings may be formed in the rigid inner shell to facilitate filling of the reservoir with the fluid for transport, as well as removal of the fluid from the reservoir. A refrigeration system may be in thermal communication with the reservoir for maintaining the temperature of the fluid in the reservoir within an acceptable temperature range.

The rigid inner shell may be covered by a thermal insulation layer, which may be formed from fiberglass, or other insulating materials known in the art. The thermal insulation layer may be covered with an external shell, such as stainless steel sheets, which are more flexible in nature than the heavy duty material used in forming the rigid inner wall.

Figure 1:
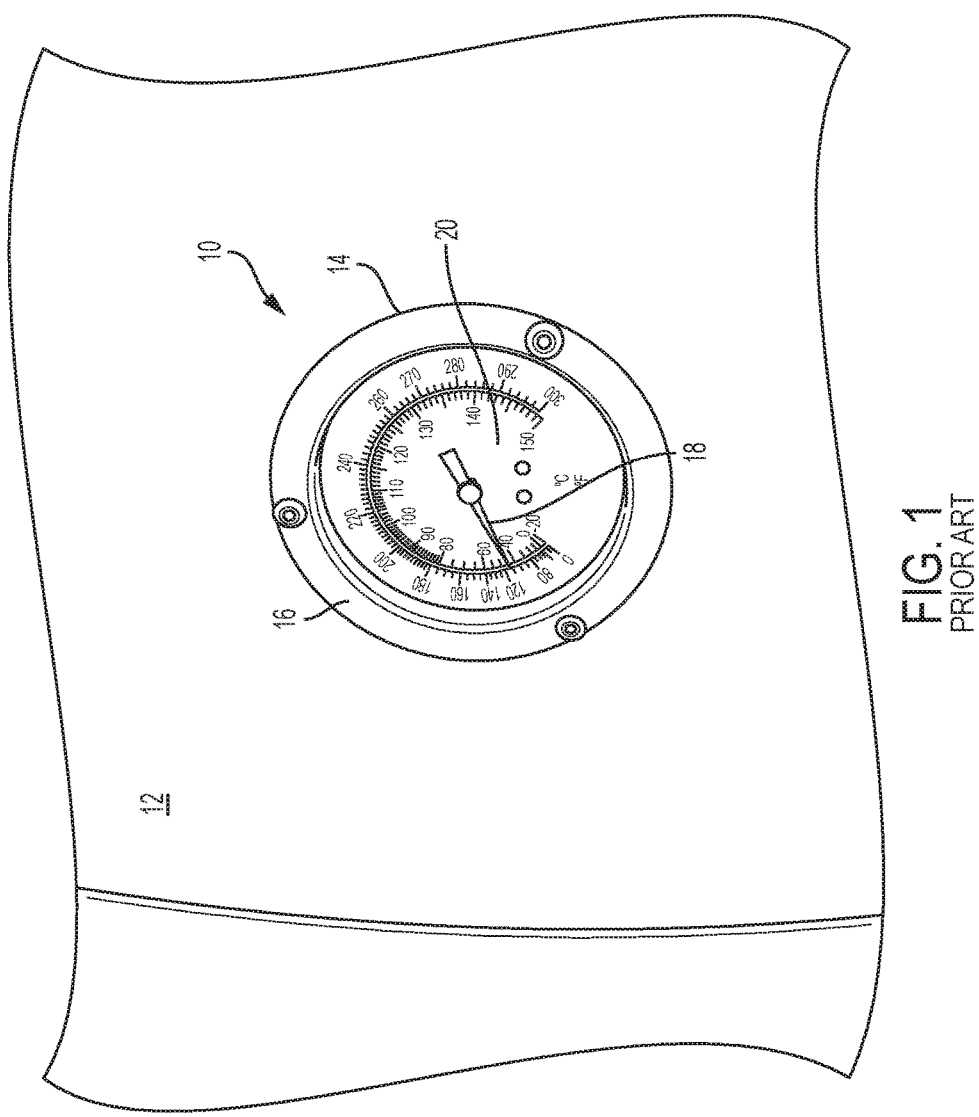
FIG. 1 is a front view of a prior art analog temperature gauge integrated into a food grade fluid transport container.

Referring now to FIG. 1, there is depicted a prior art, analog temperature gauge 10 coupled to the external shell 12 of a food grade fluid transport container. The analog temperature gauge may include a sensor (not shown), which is in thermal communication with the rigid inner shell of the fluid transport container to sense the temperature of the rigid inner shell. The sensor may be in operative communication with gauge assembly 14, which includes a flange 16 coupled to the external shell 12, a needle 18, and a face 20 having temperature markings formed thereon. Flange 16 may be coupled to the external shell with rivets, or other mechanical fasteners in the art. The position of the needle 18 relative to the face 20 provides an individual viewing the temperature gauge 10 with the temperature of the rigid inner shell.

Although an analog temperature gauge 10 provides the ability to monitor the temperature of the inner shell, and thus, the temperature of the fluid stored in the container, the analog temperature gauge 10 suffers from certain drawbacks. An initial drawback is that an individual may be required to stand generally in front of the analog temperature gauge 10 to read the gauge 10. Certain shipping standards or regulations may require that the temperature of the fluid within the container be monitored regularly, perhaps at least once an hour. Accordingly, the driver of the truck may be required to stop the truck, exit the cab, read the gauge 10 and record the reading. This may be a very time consuming and tedious task, which may significantly slow down the transport of the fluid in the container. Furthermore, if the truck is stuck in traffic or the road does not provide suitable space to pull the truck over to park the truck, it may be difficult to obtain the reading. If the reading cannot be made, and the temperature of the fluid cannot be confirmed, the entirety of the fluid may require disposal, which may be extremely costly.

Figure 2:
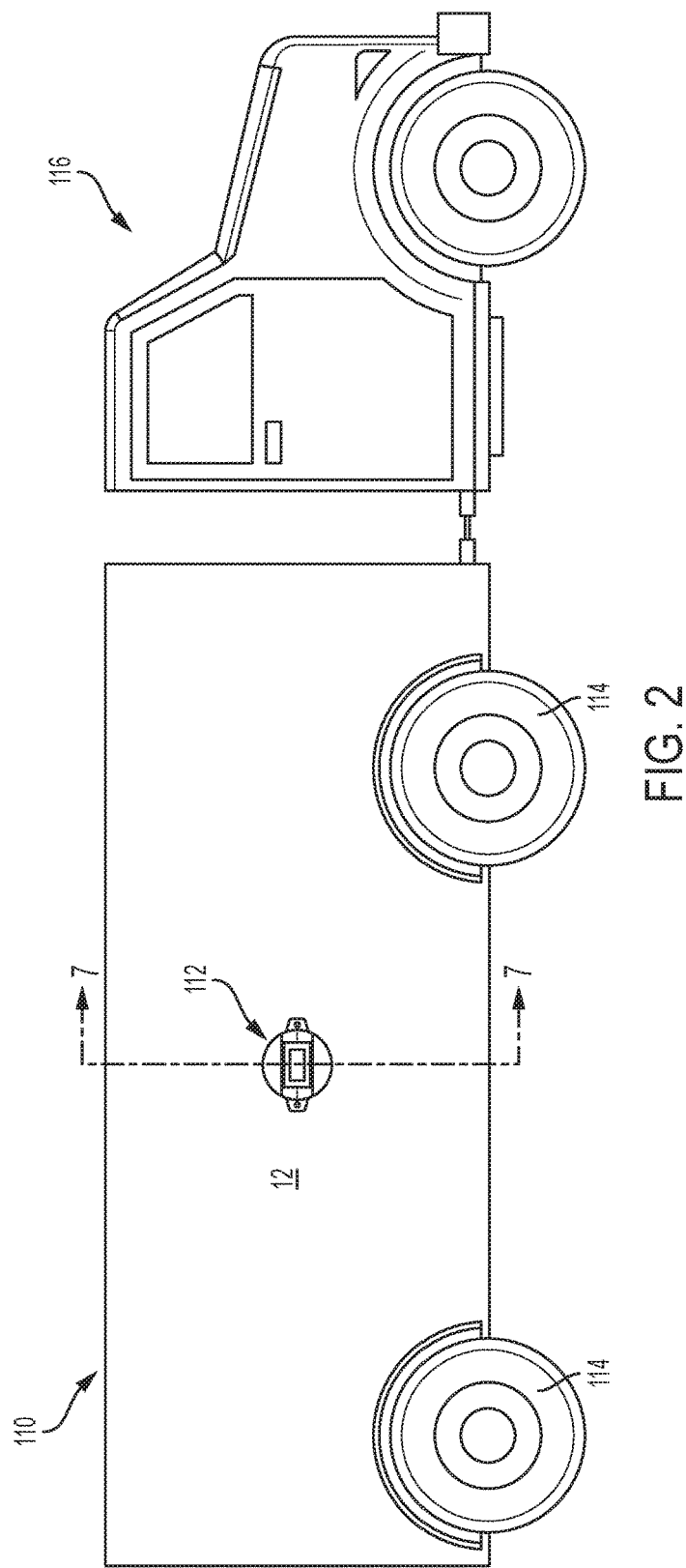
FIG. 2 is a side view of a truck and food grade fluid transport container having a digital thermometer coupled thereto.

Various aspects of the present disclosure are aimed at providing a telemetric digital thermometer which addresses the drawback associated with conventional temperature gauges. Referring now specifically to FIG. 2, there is depicted food grade fluid transport container 110 having telemetric digital thermometer 112 coupled to external shell 12 of the fluid transport container 110. The fluid transport container 110 includes wheels 114 and is connected to semi-truck 116 to facilitate transport of the fluid transport container 110.

Figure 3:
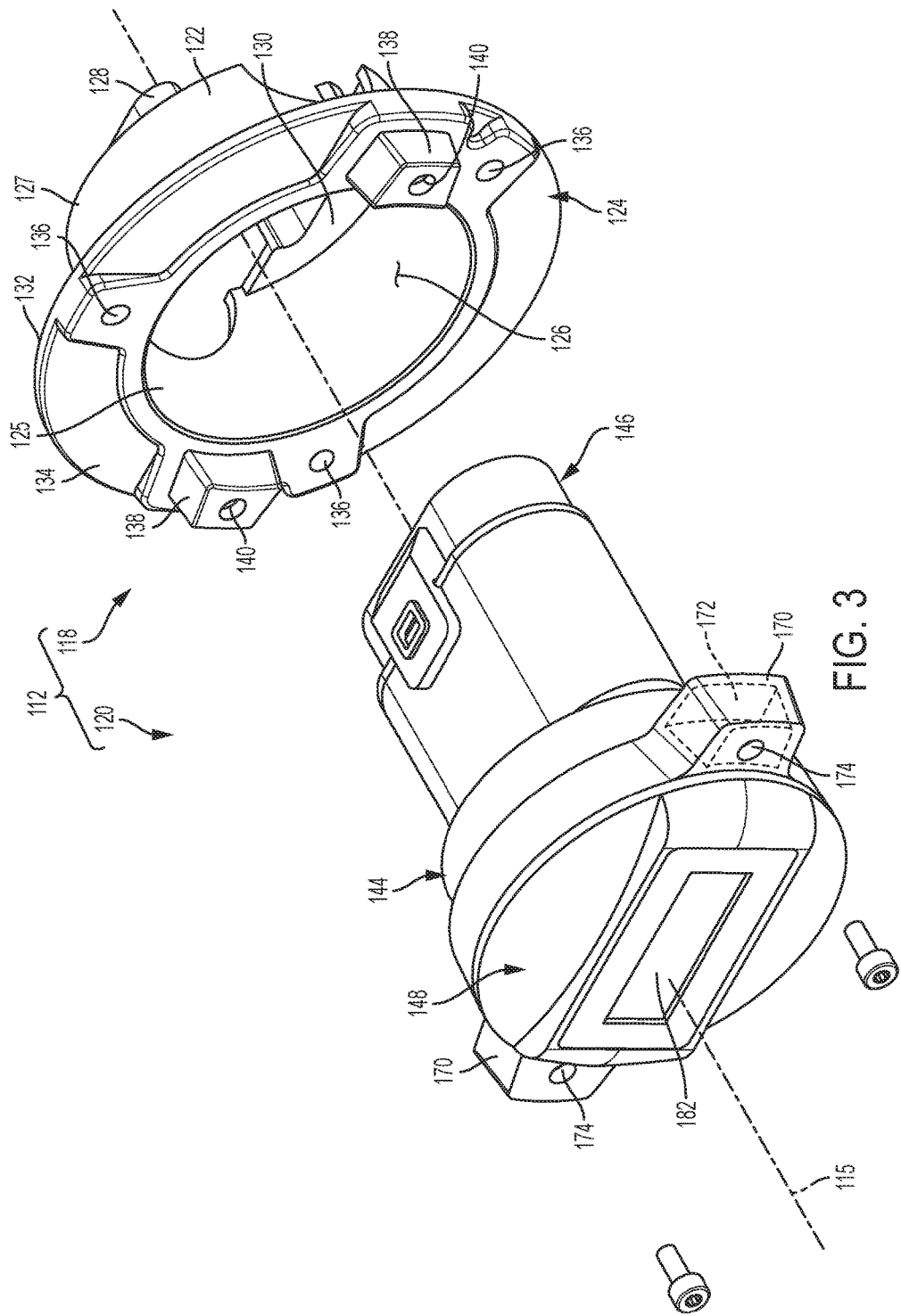
FIG. 3 is a partial, exploded upper perspective view of the digital thermometer of FIG. 2, including a mount and a thermometer insert.

Referring now to FIG. 3, the telemetric digital thermometer 112 is shown, and generally includes a mount 118 and a telemetric thermometer insert 120 engageable with the mount 118 along a thermometer axis 115. The mount 118 itself may generally include a primary support collar 122 and a peripheral flange 124 extending radially outward from the support collar 122. The primary support collar 122 and peripheral flange 124 may be disposed about a central opening 126, which may be sized to receive at least a portion of the thermometer insert 120. According to various embodiments, the central opening 126 may have a maximum diameter of approximately 2.5-4.0 inches, and in some particular embodiments, the central opening 126 be approximately 3 inches or 3.5 inches. The primary support collar 122 may extend axially rearward from the peripheral flange 124, i.e., toward the inner shell of the fluid transport container 110 when mounted thereto. In this regard, the primary support collar 112 may include a first end portion 125 coupled to the peripheral flange 124, and a second end portion 127 positioned away from the peripheral flange 124.

The mount 118 may additionally include a secondary support collar 128 extending from the second end portion 127 of the primary support collar 122. The secondary support collar 128 may be spaced radially inward from the primary support collar 122, relative to the axis 115 to define a shoulder 130 extending between the primary support collar 122 and the secondary support collar 128. The secondary support collar 128 may be open at the end opposite the primary support collar 122 to allow at least a portion of the thermometer insert 120 to be inserted therethrough.

The primary support collar 122 and/or secondary support collar 128 may include notches or cutouts to reduce the overall weight of the mount 118 or to engage with the thermometer insert 120 in a manner which ensures the thermometer insert is in a particular orientation relative to the mount 118.

The primary support collar 122 may be circumscribed by the peripheral flange 124, with the peripheral flange 124 including an internal surface 132 and an opposing external surface 134. The peripheral flange 124 may include a plurality of mounting apertures 136 formed therein to facilitate securement of the mount to the external shell of the fluid transport container 110. In the exemplary embodiment, three mounting apertures 136 are formed within the peripheral flange 124, with the mounting apertures 136 being generally equidistantly spaced apart from each other, i.e., separated by approximately 120 degrees. Although the exemplary embodiment includes three mounting apertures 136, it is understood that the present disclosure is not limited thereto, and that other embodiments may include more than three mounting apertures 136 or fewer than three mounting apertures 136. Furthermore, it may not be necessary to have the mounting apertures 136 evenly spaced from each other. The portion(s) of the peripheral flange 124 which are adjacent the mounting apertures 136 may be thickened, i.e. may protrude further from the internal surface 132, to enhance the structural integrity of the peripheral flange 124.

The mount 118 may additionally include at least one mount projection 138 extending away from the peripheral flange 124. The exemplary mount 118 includes a pair of generally diametrically opposed mount projections 138, although it is understood that any number of mount projections 138 may be used without departing from the spirit and scope of the present disclosure. The mount projections 138 each include a projection aperture 140 formed therein to provide a robust interconnection between the mount 118 and the thermometer insert 120, as will be described in more detail below.

Figure 4:
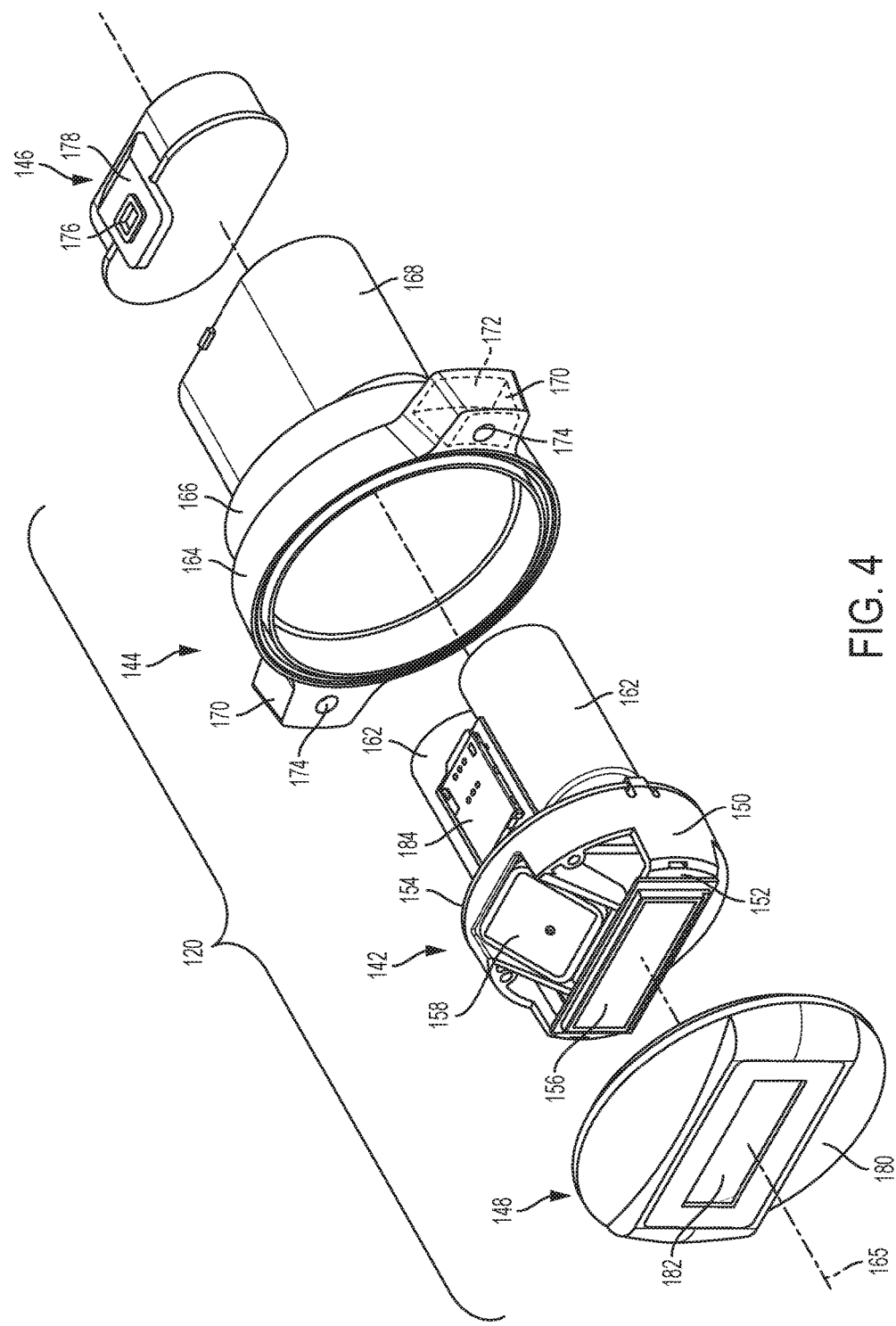
FIG. 4 is an exploded upper perspective view of the thermometer insert depicted in FIG. 3.

Referring now to FIG. 4, the thermometer insert 120 includes an insert base 142, a primary insert housing 144, a secondary insert housing 146, and a cover 148. The insert base 142 may provide the structure to which electrical components of the thermometer insert 120 may be mounted, as will be discussed below. In general, the insert base 142 may include an outer circumferential surface 150, a forward surface 152 extending between diametrically opposed portions of the circumferential surface 150, and a rearward surface 154 opposite the forward surface 152.

A digital display 156 may be mounted on the forward surface 152, with the digital display 156 being operative to depict data and/or information to a user. For instance, the digital display 156 may depict a sensed temperature, as well as an indicator as to whether the sensed temperature is within an acceptable temperature range, or whether the temperature falls outside an acceptable temperature range. The digital display 156 may also provide a visual indication as to whether the digital thermometer 112 is in wireless communication with a wireless communication network or other wireless communication device, as will be described in more detail below. The digital display 156 may be any digital display device known in the art.

The thermometer insert 120 may include a GPS module 158 mounted to the insert base 142 to allow for position detection of the digital thermometer 112. The GPS module 158 may be located on the insert base 142 in a forward location, such that the GPS module 158 is positioned outside of the fluid transport container 110 to mitigate signal interference caused by the fluid transport container 110, as will be described in more detail below. In the exemplary embodiment, the insert base 142 includes an angled surface extending radially inward between the circumferential surface 150 and a center of the insert base 142, and in an axial direction between the forward surface 152, and the rearward surface 154. As shown in FIG. 4, the angled surface extends upwardly between the forward surface 152 and the circumferential surface 150. At least a portion of the GPS module 158 is mounted on the angled surface to facilitate signal reception from GPS satellites. In other words, the GPS module 158 may be facing upwardly when the telemetric digital thermometer 112 is mounted on the fluid transport container 110 to more easily receive a GPS signal.

The GPS module 158 allows a remote user to monitor the location of the fluid delivery container 110. For instance, a fleet management company may be able to monitor the respective locations of a fleet of fluid transport containers 110 from a home office to ensure delivery of the fluid within the container 110. The ability to monitor the location of the fluid delivery container 110 may also protect against theft of the container 110.

The thermometer insert 120 additionally includes a battery 162 or other power source. According to one embodiment, the thermometer insert 120 includes two batteries 162, which are coupled to the insert base 142, with the batteries 162 extending away from the rearward surface 154. In one implementation, each battery 162 defines a longitudinal axis, which is substantially parallel to an insert longitudinal axis 165. The batteries 162 may be Li—SOCL$_2$ batteries that are 3.6V and have a max continuous current of 1000 mA.

The insert base 142 may be engageable with the primary insert housing 144, which includes an outer collar 164, an intermediate collar 166, and an inner collar 168. The outer collar 164 defines a first diameter, and the intermediate collar 166 defines a second diameter less than the first diameter, and thus, is spaced closer to an insert axis 165. The inner collar 168 is spaced closer to the insert axis 165 than the intermediate collar 166, and is of a generally oval configuration, which generally conforms to the configuration of the batteries 162. The intermediate collar 166 is positioned axially between the outer collar 164 and the inner collar 168, with a first shoulder extending between the intermediate collar 166 and the outer collar 164, and a second shoulder extending between the intermediate collar 166 and the inner collar 168. When the insert base 142 is inserted within the primary insert housing 144, a portion of the outer circumferential surface 150 of the insert base 142 may be engaged with, or support by the collar 166.

The primary insert housing 144 additionally includes a pair of diametrically opposed mounting bodies 170, each of which defines a mounting cavity 172 designed to receive respective ones of the mount projections 138 formed on the mount 118. Each mounting body 170 includes an aperture 174 formed therein, which is aligned with a corresponding aperture 136 formed on the respective mount projection 138, and a mechanical fastener, such as a screw, may be advanced through the aligned apertures 136, 174 to connect the thermometer insert 120 to the mount 118. The size and nested arrangement of the mount projections 138 within respective mounting cavities 172, and the related interface between the mount projections 138 and mount bodies 170 strengthens the interconnection between the thermometer insert 120 and the mount 118. The strengthened interconnection may be particularly suited to withstand torque and vibrations that are generated during use of the digital thermometer 112. The torque and vibrations may be generated as the fluid transport container 110 travels over a roadway.

The secondary insert housing 146 may be connectable to the primary insert housing 144, with the primary and secondary insert housings 144, 146 collectively defining at least a portion of a cavity within which the batteries 162 may be received. The primary and second insert housings 144, 146 may be cooperatively engageable via snap-tabs or other mechanical fasteners known in the art. As shown in FIGS. 3 and 4, the primary insert housing 144 includes a raised element 176, which is received within an opening formed in a tab or tongue 178 extending from the secondary insert housing 146.

The cover 148 is positioned opposite the secondary insert housing 146, and is engaged with the primary insert housing 144 to cover the components located within the primary insert housing 144. According to one embodiment, the cover 148 is ultrasonically welded to the primary insert housing 144, although other attachment mechanisms, such as adhesives or fasteners known in the art may be used. The cover 148 may include a cover body 180 and window 182, which extends over the digital display 156 to allow a user to view the digital display 156 when the cover 148 is connected to the primary insert housing 144.

Since the fluid transport container 110 may be exposed to the elements, such as rain and snow, the digital thermometer 112 may be designed to withstand exposure to water. In this regard, the digital thermometer 112 may include one or more gaskets to inhibit the migration of water from the outside environment to the electrical component housed within the thermometer insert 120. For instance, a gasket may be positioned about the insert base 142 between the cover 148 and the primary insert housing 144. Another gasket may optionally be located between the primary insert housing 144 and the secondary insert housing 146. Furthermore, it is contemplated that a gasket may be located between the mount 118 and the external surface of the fluid transport container 112.

Figure 5:
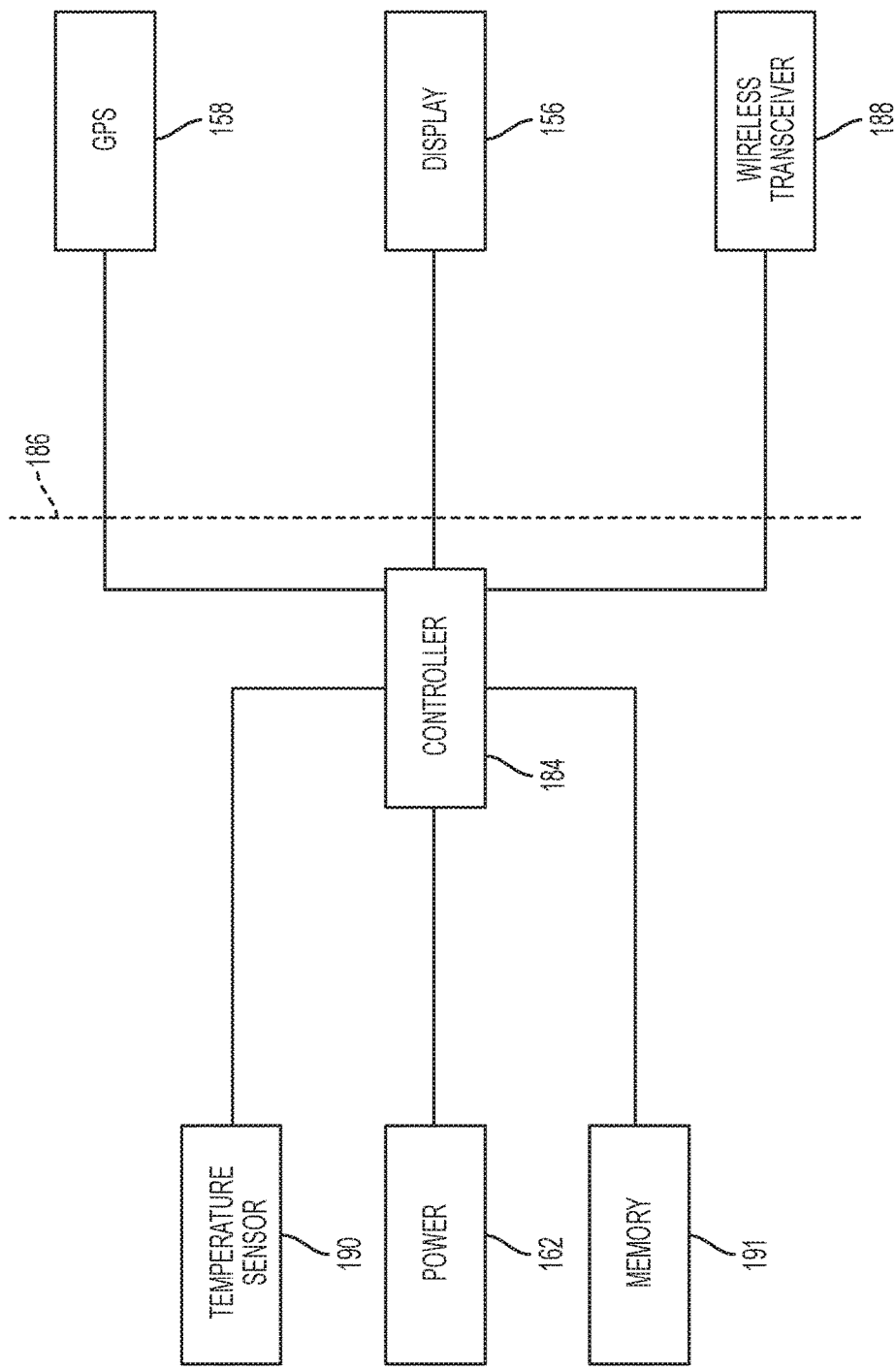
FIG. 5 is an electrical schematic of various electrical components included in the digital thermometer.

Referring now to FIG. 5, there is depicted a schematic diagram of certain electrical components included in one embodiment of the digital thermometer 112. FIG. 5 includes a dotted line 186, which corresponds to the external shell of the fluid transport container 110. As can be seen certain electrical components may be located outside of the external shell, while other electrical components may be located inside of the external shell. In the exemplary embodiment, the digital display 156, the GPS module 158 and a wireless transceiver 188 may be located outside of the external shell, represented by dotted line 186. Stated another way, the peripheral flange 124 may provide another frame of reference to illustrate the unique location of the GPS module 158 and the wireless transceiver 188. In particular, the outer circumference of the peripheral flange 124 resides within a reference plane. When the thermometer insert 120 is engaged with the mount 118, the GPS module 158 and wireless transceiver 188 are located on a first side (i.e., the outside) of the reference plane, while the batteries 162 and the secondary insert housing 146 reside on a second side (i.e., the inside) of the reference plane. By locating the GPS module 158 and the wireless transceiver 188 outside of the external shell, signal interference caused by the external shell is mitigated. In other words, the GPS module is outside of the external shell and can more easily receive a GPS signal from a GPS transmitter, e.g., GPS satellite. Furthermore, the wireless transceiver 188 can more easily transmit and receive signals with little to no interference from the exterior shell. As discussed above, the digital display 156 may be coupled to the forward surface 152 of the insert base 142, while the GPS module 158 may be mounted to the angled surface of the insert base 142. The wireless transceiver 188 may also be mounted to the insert base 142, such as on the opposite side of the digital display 156, relative to the GPS module 158. Alternatively, the wireless transceiver 188 may be mounted on the cover 148. The wireless transceiver 188 may include a flex PCB antenna or a patch antenna.

The controller 184 may be in electrical communication with a temperature sensor 190, which may be placed in thermal communication with the internal shell of the fluid transport container 110 to sense the temperature thereof. According to one embodiment, the temperature sensor may be capable to detecting temperature within the range of −58° F.-257° F., with an accuracy of +/−0.3° F. The controller 184 may also be in electrical communication with the digital display 156, GPS module 158, power supply 162 and wireless transceiver 188. The controller 184 may include preprogrammed instructions for operating the digital thermometer 112, as will be described in more detail below.

The controller 184 may additionally be in electrical communication with memory module 191, which may store data and/or information either temporarily, or on a more permanent basis, as needed. The memory module 191 may employ flash memory, or other memory mechanisms known in the art.

With the basic structure of the telemetric digital thermometer 112 described above, an exemplary discussion regarding use of the telemetric digital thermometer 112 is provided below. Along these lines, it is contemplated that the telemetric digital thermometer 112 may be specifically designed to be retrofitted onto an existing fluid transport container 110 having an analog thermometer mounted thereto. Therefore, to install the telemetric digital thermometer 112, the analog thermometer is removed from the fluid transport container 110. The telemetric digital thermometer 112 is sized and structured to fit within the same cavity as the analog thermometer, and so once the analog thermometer is removed from the fluid transport container 110, the telemetric digital thermometer 112 can be mounted thereto.

The mount 118 may be attached to the external shell 12 of the fluid transport container 110 by riveting or otherwise fastening the peripheral flange 124 to the external shell 12. A gasket or caulking material may be disposed at the interface of the peripheral flange 124 and the external shell 12 to mitigate fluid entry through such interface.

The temperature sensor 190 is mounted to the internal shell 192 such that the temperature sensor 190 is in thermal communication with the internal shell 192. An electrical wire 194 extends between the temperature sensor 190 and the thermometer insert 120 to allow for communication between the temperature sensor 190 and the controller 184.

The thermometer insert 120 is connected to the mount 118 by advancing a portion of the thermometer insert 120 into the opening defined by the mount 118. The electrical wire 194 extending between the temperature sensor 190 and the thermometer insert 120 may also be placed in the opening. The thermometer insert 120 is connected to the mount 118 by aligning the mounting bodies 170 of the thermometer insert 120 with the mount projections 138 of the mount 118. The thermometer insert 120 is advanced over the mount 118, with the mount projections being received within respective mounting cavities 172 defined by the mounting bodies 170. A screw or other mechanical fastener may be advanced through the aligned apertures 136, 174 to secure the thermometer insert 120 to the mount 118. Along these lines, at least one of the apertures 136, 174 may be internally threaded to facilitate engagement with the screw. As noted above, a gasket or other sealing member may be positioned between the thermometer insert 120 and the mount 118 to mitigate fluid entry into the thermometer insert 120.

Figure 7:
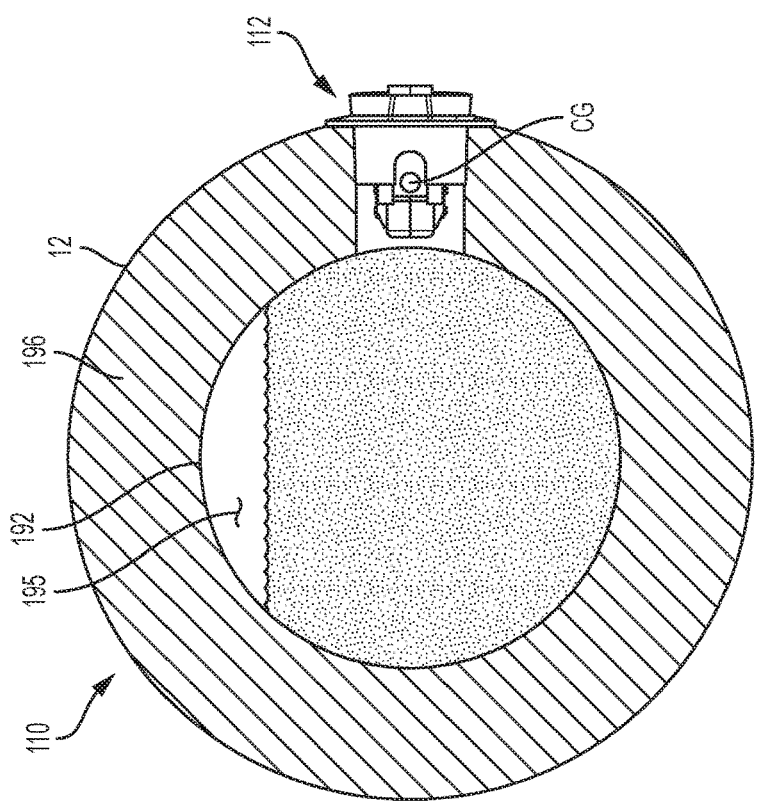
FIG. 7 is a sectional view of the food grade fluid transport container and the digital thermometer.

Referring now to FIG. 7, there is depicted sectional view of the fluid transport container 110. The internal shell 192 is shown defining reservoir 195. External shell 12 extends around internal shell 192, with insulation layer 196 extending between the internal shell 192 and external shell 12. According to one embodiment, when the digital thermometer 120 is coupled to the fluid transport container 110, the center of gravity, CG, may be positioned radially inward of the external shell 12 (i.e., inside the external shell 12). Accordingly, a torque may be applied at the interface of the mount 118 and thermometer insert 120. Furthermore, as the fluid transport container 110 Thus, the enlarged mount projections 138 and corresponding mounting bodies 170 are designed to withstand such torques. Furthermore, the configuration of the peripheral flange 124 distributes the forces exerted by the peripheral flange 124 on the external shell 12, so as to mitigate damage that may be imparted to the external shell 12.

During operation, the temperature sensor 190 senses the temperature of the internal shell 192 and transmits an electrical signal including temperature data associated with the sensed temperature along the electrical wire 194 to the controller 184 of the thermometer insert 120. The controller 184 may transmit a signal including the temperature data to the digital display 156 to display the sensed temperature, which may be viewed by a user looking at the digital thermometer 112. The controller 184 may also transmit a signal including the temperature data to the wireless transceiver 188 for upload to a remote receiver. In this regard, the wireless transceiver 188 may transmit the temperature data to a cellular communications network (e.g., 3G or 4G cellular network), a short-range wireless communications network, such as Bluetooth™, Zigbee, WiFi, or other communication networks/protocols known in the art. As such, the wireless transceiver 188 allows the digital thermometer 112 to operate as a telemetric system. The remote receiver may be a server, computer, handheld communication device, etc. For instance, the remote receiver may be located in an office associated with the fluid transport container 110 to receive the temperature data for monitoring the container 110 during transport.

The controller 184 may also receive position data from the GPS module 158 and instruct the wireless transceiver 188 to upload the position data to the remote location.

The controller 184 may include preprogrammed operational instructions which govern operation of the telemetric digital thermometer 112. For instance, the preprogrammed operational instructions may include time parameters for when the temperature sensor 190 detects the temperature, when the GPS module 158 detects position data, as well as time parameters for when the wireless transceiver 188 uploads data. According to one embodiment, temperature data and position data are uploaded at least once an hour. The upload may include temperate data collected at several points in time (such as every minute, every 5 minutes, every 10 minutes, every 15 minutes, every half hour, every hour, etc.). Furthermore, every time temperature data is collected, position data may also be collected. Alternatively, position data may be collected independent of temperature data.

The controller 184 may also have a comparison module for comparing the sensed temperature with an acceptable temperature range. If the sensed temperature falls outside of a preset temperature range, the controller 184 may generate an alert signal, which may be displayed on the digital display 156 and/or transmitted by the wireless transceiver 188. Conversely, if the sensed temperature falls within a prescribed temperature range, the controller 184 may generate a signal indicating the sensed temperature is acceptable, with such signal being displayed on the digital display 156 and/or transmitted by the wireless transceiver 188.

The wireless transceiver 188 may not only be capable of transmitting data and information to a remote location, the wireless transceiver 188 may also be capable of receiving data, information, commands, or instructions from a remote location. In this regard, a specific request for real-time temperature data and/or position data may be generated at a remote location and received by the wireless transceiver 188. The command may then be relayed to the controller 184, which executes the particular request that is received. It is also contemplated that the wireless transceiver 188 may be used to re-program the controller 184. For instance, a new upload schedule, acceptable temperature range, remote signal destination, etc., may be changed via communications with the controller 184 through the wireless transceiver 188. Along these lines, it is also contemplated that the digital thermometer 112 may include a user interface, which may allow for such reprogramming directly on the digital thermometer 112. The user interface may include one or more knobs, buttons, touch screens, data ports (e.g., USB port), etc.

Figure 8:
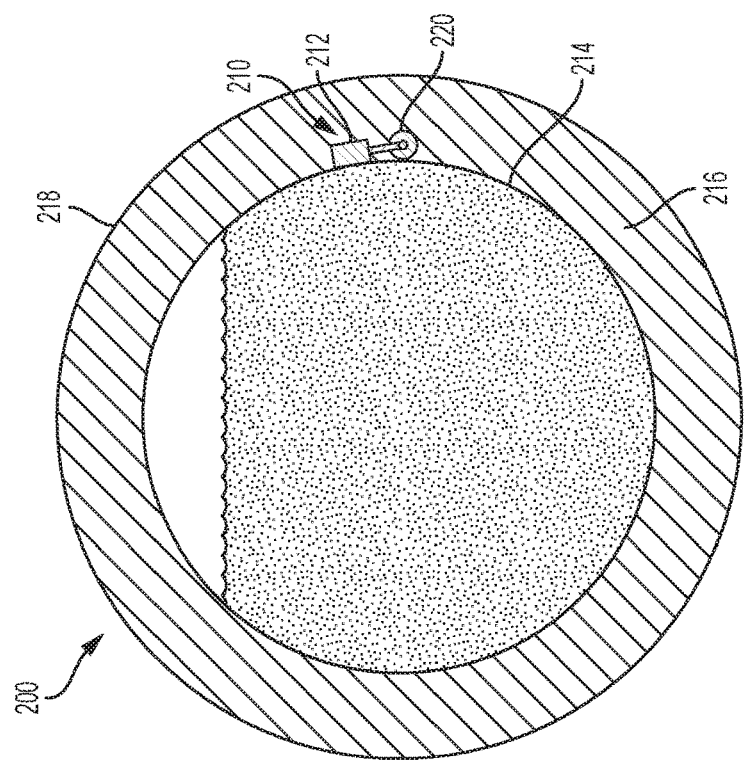
FIG. 8 is a section view of another embodiment of a food grade fluid transport container and an interior temperature gauge.

Although the foregoing describes a digital thermometer that can be retrofitted onto an existing fluid transport container 110 to provide visual indication of a sensed temperature, as well as the ability to communicate the sensed temperature to a remote location, it is contemplated that other embodiments of the digital thermometer may be embedded within the fluid transport container. Such embodiments may be particularly suited for installation during original construction of the fluid transport container. Referring now to FIG. 8, a cross sectional of a fluid transport container 200 is shown having digital thermometer 210, which may include a temperature sensor 212 in thermal communication with an internal shell 214 of the fluid transport container 200. The temperature sensor 212 may be installed within a housing, or may be exposed to the insulation 216 filling the area between the internal shell 214 and external shell 218. The temperature sensor 212 may be in electrical communication with a communication conduit 220, which extends over the internal shell 214. The communication conduit 220 may extend to an outer surface of the fluid transport container 200, and may terminate at a terminal. Various communication devices may be connected to the terminal to facilitate transmission of the data. For instance, a wireless communication device may be connected to the terminal to transmit and receive information and data, similar to that described above in relation to the wireless transceiver. Furthermore, a power source may be connected to the terminal to provide power to the temperature sensor. The terminal may also be connected to a communication link, which may extend to the cab of the semi-truck to allow the truck driver to easily monitor the status of the sensed temperature.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A food grade fluid container trailer with a telemetric digital thermometer for use with a food grade fluid transport container, the trailer comprising:
  the food grade fluid transport container having:
    an internal shell defining a reservoir for receiving fluid; and an external shell spaced from the internal shell; and
    insulation disposed between the internal and external shells;
  the telemetric digital thermometer comprising:
  a mount having a peripheral flange and a primary support collar, the peripheral flange extending radially outward from the primary support collar and being connectable to the external shell;
  a temperature sensor connectable to the internal shell for sensing a temperature of the internal shell; and
  a thermometer insert operatively connected to the temperature sensor and connectable to the mount, the thermometer insert having:
    an outer collar engageable with the peripheral flange;
    an inner body engageable with the primary support collar;
    a GPS module to detect position of the thermometer insert; and
    a wireless transceiver in operative communication with the temperature sensor and the GPS module to transmit a signal including temperature data from the temperature sensor and position data from the GPS module;
  the thermometer insert and the mount collectively being sized and structured such that the GPS module is positioned radially outward of the external shell when the thermometer insert is connected to the mount and the mount is connected to the external shell.

2. The trailer of claim 1 wherein the GPS module includes an antennae and the antennae is positioned radially outward of the external shell when the thermometer insert is connected to the mount and the mount is connected to the external shell.

3. The trailer recited in claim 1, wherein the mount includes a central opening sized and structured to receive at least a portion of the thermometer insert.

4. The trailer recited in claim 1, wherein the mount includes a secondary support collar disposed radially inward of the primary support collar.

5. The trailer recited in claim 1, wherein the peripheral flange completely circumnavigates the primary support collar.

6. The trailer recited in claim 1, wherein the mount includes a plurality of apertures formed in the peripheral flange.

7. The trailer recited in claim 1, wherein the thermometer insert includes a digital display in communication with the temperature sensor for displaying the temperature of the internal shell.

8. The trailer recited in claim 1, further comprising a battery in communication with the GPS module and the wireless transceiver.

9. The trailer recited in claim 1, further comprising a controller in operative communication with the temperature sensor and the wireless transceiver, the controller controlling the temperature sensor and wireless transceiver according to preprogrammed timing parameters.

10. The trailer recited in claim 1, further comprising a controller in operative communication with the temperature sensor and the wireless transceiver, the controller receiving temperature data from the temperature sensor and comparing received temperature data with a predetermined temperature range, the controller generating instructions for the wireless transceiver to emit an alert signal when the received temperature data falls outside of the predetermined temperature range.

11. The trailer recited in claim 1, further comprising a controller in operative communication with the temperature sensor and the wireless transceiver, the controller receiving temperature data from the temperature sensor and generating instructions for the wireless transceiver to emit an alert signal when the received temperature data is above a predetermined maximum temperature threshold.

12. The trailer recited in claim 1, wherein the wireless transceiver is operative to receive a request signal from a remote electronic device, and request temperature data from the temperature sensor in response to receiving the request signal.

13. The trailer recited in claim 1, wherein the mount includes a pair of mount projections extending from the peripheral flange.

14. The trailer recited in claim 13, wherein each mount projection includes an aperture extending therethrough.

15. The trailer recited in claim 13, wherein the thermometer insert includes a pair of mount bodies, each mount body having a mounting cavity, the pair of mount projections being received within a respective mounting cavity when the thermometer insert is engaged with the mount.

16. The trailer recited in claim 15, wherein the pair of mount projections are in diametrically opposed relation to each other, and the pair of mount bodies are in diametrically opposed relation to each other.

17. A telemetric digital thermometer for use with a food grade fluid transport container trailer, the trailer comprising:
a food grade fluid transport container having:
an internal shell defining a reservoir for receiving fluid;
an external shell spaced apart from the internal shell; and
insulation disposed between the internal and external shells;
the telemetric digital thermometer comprising:
a body having a peripheral flange connectable to the external shell;
a temperature sensor connectable to the body for sensing a temperature of the internal shell;
a GPS module coupled to the body and detecting a position of the body; and
a wireless transceiver coupled to the body and in operative communication with the temperature sensor and the GPS module to transmit a signal including temperature data from the temperature sensor and position data from the GPS module;
a thermometer insert connected to the temperature sensor and to the body;
wherein the thermometer insert and the body collectively being sized and structured such that the GPS module is positioned radially outward of the external shell when the body is connected to the external shell.

18. The trailer recited in claim 17, further comprising a controller in operative communication with the temperature sensor and the wireless transceiver, the controller controlling the temperature sensor and wireless transceiver according to preprogrammed timing parameters.

19. The trailer recited in claim 17, further comprising a controller in operative communication with the temperature sensor and the wireless transceiver, the controller receiving temperature data from the temperature sensor and comparing received temperature data with a predetermined temperature range, the controller generating instructions for the wireless transceiver to emit an alert signal when the received temperature data falls outside of the predetermined temperature range.

20. The trailer recited in claim 17, further comprising a controller in operative communication with the temperature sensor and the wireless transceiver, the controller receiving temperature data from the temperature sensor and generating instructions for the wireless transceiver to emit an alert signal when the received temperature data is above a predetermined maximum temperature threshold.

21. The trailer recited in claim 17, wherein the wireless transceiver is operative to receive a request signal from a remote electronic device, and request temperature data from the temperature sensor in response to receiving the request signal.

22. A food grade fluid container trailer for transporting food grade fluid, the food grade fluid container trailer attachable to a vehicle, the trailer comprising:
a food grade fluid transport container having:
an internal shell defining a reservoir for receiving fluid;
an external shell spaced apart from the internal shell;
insulation disposed between the internal and external shells;
a telemetric digital thermometer comprising:
a mount having a peripheral flange and a primary support collar, the peripheral flange extending radially outward from the primary support collar and connected to the external shell;

a temperature sensor connected to the internal shell for sensing a temperature of the internal shell; and a thermometer insert connected to the temperature sensor and connected to the mount, the thermometer insert having:

an outer collar engageable with the peripheral flange;

an inner body engageable with the primary support collar;

a battery pack;

a GPS module to detect position of the thermometer insert; and a wireless transceiver in operative communication with the temperature sensor and the GPS module to receive and transmit a wireless signal including temperature data from the temperature sensor and position data to and from the GPS module;

wherein the thermometer insert and the mount are collectively sized and structured such that the GPS module is positioned outside, whereas the battery pack is positioned inside, of a plane defined by the external shell when the thermometer insert is connected to the mount and the mount is connected to the external shell to facilitate receipt and transmission of the wireless signal.

23. A food grade fluid container trailer for transporting food grade fluid, the food grade fluid container trailer attachable to a vehicle, the trailer comprising:

a food grade fluid transport container having:

an internal shell defining a reservoir for receiving fluid;

an external shell spaced apart from the internal shell;

insulation disposed between the internal and external shells;

a telemetric digital thermometer comprising:

a body having a peripheral flange connected to the external shell;

a temperature sensor connected to the internal shell of the food grade fluid transport container for sensing a temperature of the internal shell;

a battery pack attached to the food grade fluid transport container;

a GPS module coupled to the food grade fluid transport container and detecting a global position of the body; and a wireless transceiver coupled to the food grade fluid transport container and in operative communication with the temperature sensor, the battery pack, and the GPS module to transmit a signal including temperature data from the temperature sensor and position data from the GPS module;

a thermometer insert connected to the temperature sensor and to the body;

wherein the thermometer insert and the body are collectively sized and structured such that the GPS module is positioned radially outside of a plane defined by the external shell when the body is connected to the external shell to facilitate wireless transmission.

\* \* \* \* \*